(12) United States Patent
Kim

(10) Patent No.: US 7,348,770 B2
(45) Date of Patent: Mar. 25, 2008

(54) ELECTRONIC DEVICE FOR INTERRUPT SIGNAL CONTROL TO ACQUIRE ENCODER SPEED INFORMATION AND A METHOD THEREOF

(75) Inventor: Hyoung-il Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 11/404,919

(22) Filed: Apr. 17, 2006

(65) Prior Publication Data

US 2007/0108966 A1 May 17, 2007

(30) Foreign Application Priority Data

Nov. 11, 2005 (KR) .................. 10-2005-0108227

(51) Int. Cl.
*G01P 3/44* (2006.01)
(52) U.S. Cl. ............................................. 324/166
(58) Field of Classification Search ........ 324/166–177, 324/207.2–207.25; 356/28; 702/145
See application file for complete search history.

(56) References Cited

U.S. PATENT DOCUMENTS 4,224,515 A * 9/1980 Terrell .................. 250/231.14
5,086,261 A * 2/1992 Sakata et al. ............... 318/268
6,496,786 B1* 12/2002 Dieterle et al. ............. 702/145
2005/0182591 A1* 8/2005 Taniguchi et al. .......... 702/142

FOREIGN PATENT DOCUMENTS

| JP | 06-331388 | 12/1994 |
|---|---|---|
| JP | 09-114348 | 5/1997 |
| JP | 2005-140697 | 6/2005 |
| KR | 1998-033797 | 8/1998 |
| KR | 10-2006-0005446 A | 1/2006 |

* cited by examiner

*Primary Examiner*—Jay M Patidar
(74) *Attorney, Agent, or Firm*—Roylance, Abrams, Berdo and Goodman, LLP

(57) ABSTRACT

An electronic device for acquiring encoder speed information and a method for implementing the same are provided, wherein the electronic device includes an encoder for electrically outputting an encoder signal corresponding to a driving speed, a processor unit for outputting a preset interval count value based on the resolution of the encoder, and an integrated circuit unit for outputting the interrupt count value for calculating information using the encoder signal and the interval count value. By acquiring the encoder speed information in this manner, control performance can be improved.

11 Claims, 4 Drawing Sheets

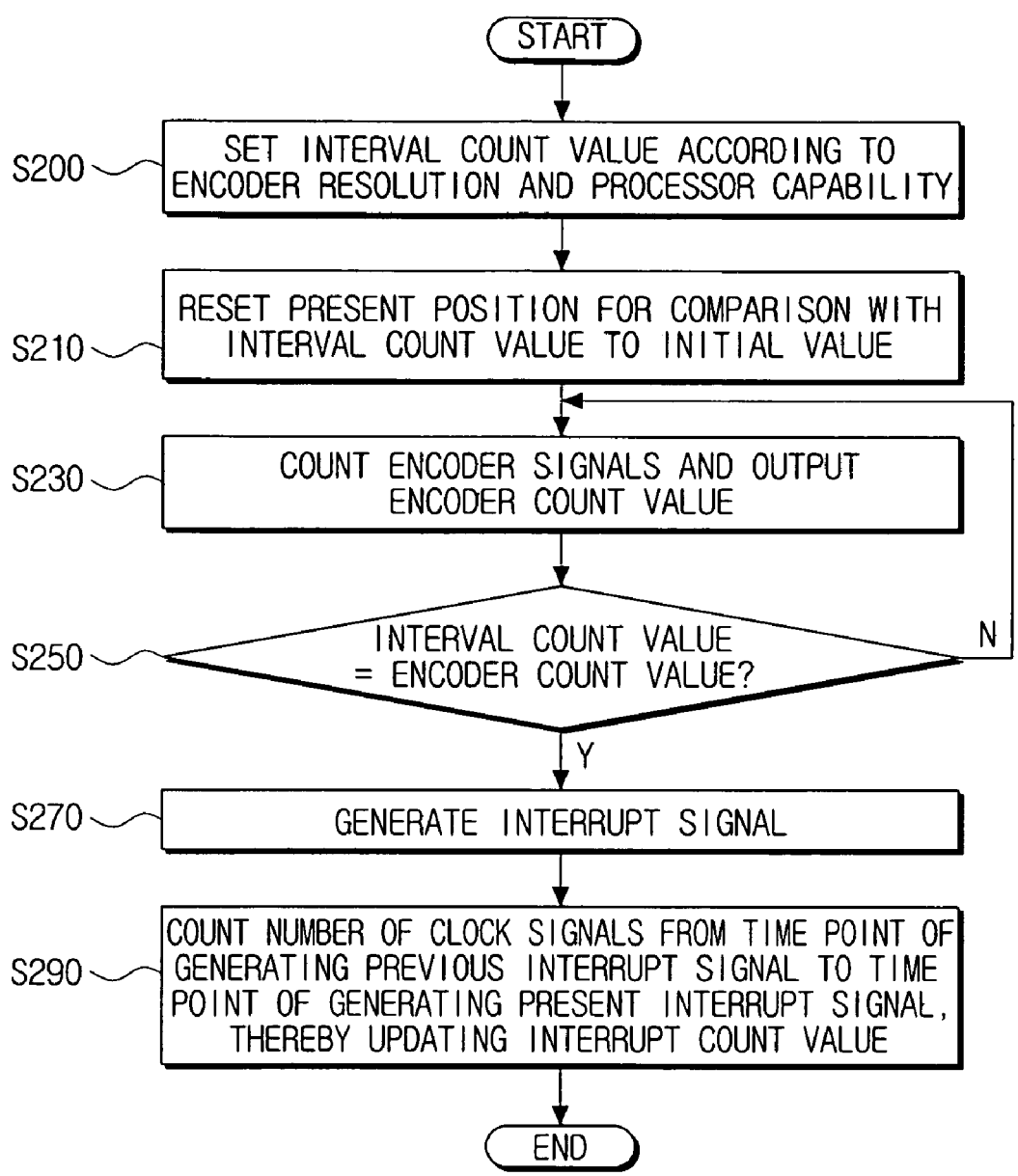

ELECTRONIC DEVICE FOR INTERRUPT SIGNAL CONTROL TO ACQUIRE ENCODER SPEED INFORMATION AND A METHOD THEREOF

CROSS-REFERENCE TO RELATED APPLICATIONS

This application claims the benefit under 35 U.S.C. §119 (a) of Korean Patent Application No. 10-2005-0108227, filed in the Korean Intellectual Property Office on Nov. 11, 2005, the entire disclosure of which is incorporated herein by reference.

BACKGROUND OF THE INVENTION

1. Field of the Invention

The present invention relates to an electronic device for acquiring encoding speed information, and a method thereof. More particularly, the present invention relates to an electronic device for acquiring encoding speed information necessary for speed control using an encoder signal output from an encoder in an electronic device that uses the encoder, and a method for acquiring the speed information thereof.

2. Description of the Related Art

Generally, an encoder is a device that detects a driving speed of a motor and outputs it as an electrical signal. Either a linear encoder or a wheel encoder can be used according to the type of the electronic device. A pulse signal corresponding to channels A and B is generated from the encoder. The driving speed of the motor can then be acquired using the pulse signal corresponding to the channels A and B.

FIG. 1 is a view for illustrating a conventional method for acquiring speed information.

Referring to FIG. 1, the encoder signal output from the encoder is an electric pulse signal corresponding to the channels A and B and having the same period and a phase difference of 90 degrees. 'Position' in FIG. 1 denotes position information of a slit, which is the actual distance on the encoder.

In the related art, the number of clock signals counted from a falling edge or a rising edge to a next falling edge or a next rising edge of the encoder signal corresponding to the channel A or B is stored in a certain register. When a still next falling edge or rising edge is generated afterwards, the number of clock signals is counted again, thereby updating the value in the certain register.

An emitter interrupt signal is generated from the falling edge or the rising edge of the encoder signal. The updated value in the certain register is supplied as the speed information required for the control of an emitter interrupt routine. More specifically, referring to FIG. 1, a first count value (count 1) is used for the speed information, a second count value (count 2), which is updated, is used next for the speed information, and a third count value (count 3), which is further updated, is used still next for the speed information, and so forth.

Recently, as diverse functions have been added to the electronic devices using the encoder, a load applied to a main processor increases and the configuration complexity of the encoder is also increased. By this, the frequency of generating the emitter interrupt increases, thereby causing potential errors in acquiring the speed information. Accordingly, the electronic device may be controlled with inaccurate speed information, thereby deteriorating the control performance.

Accordingly, a need exists for a system and method for efficiently and effectively reducing errors caused when acquiring the speed information.

SUMMARY OF THE INVENTION

An aspect of embodiments of the present invention is to substantially solve at least the above problems and/or disadvantages and provide at least the advantages described below. Accordingly, an aspect of embodiments of the present invention is to provide an electronic device for acquiring speed information which is capable of reducing errors caused when acquiring the speed information by controlling time intervals of generating interrupts to thereby improve control performance thereof, and a method for the same.

In order to achieve the above-described aspects of embodiments of the present invention, an electronic device is provided comprising an encoder which electrically outputs an encoder signal corresponding to a driving speed, a processor unit which outputs a preset interval count value based on the resolution of the encoder, and an integrated circuit unit which outputs the interrupt count value for calculating information using the encoder signal and the interval count value.

The integrated circuit unit comprises an interval count value storage unit which stores the interval count value, an encoder signal storage unit which counts an actual moved distance using the encoder signal and outputting an encoder count value, a comparison unit which generates an interrupt signal when the interval count value substantially corresponds to the encoder count value as a result of a comparison between the interval count value and the encoder count value, and an interrupt signal counter unit which generates an interrupt count value by counting intervals between the interrupt signal and a previous interrupt signal as the number of clock signals, and thereby updating the previously stored interrupt count value.

The processor unit comprises a speed information acquiring unit which acquires the speed information using the following Equation (1) below, $$V = (N*S)/(C*T) \quad (1)$$

wherein, 'V' denotes present speed information, 'N' denotes the interval count value, 'S' denotes a displacement value per count of the encoder 100, 'C' denotes the interrupt count value, and 'T' denotes an elapsed time per clock signal.

The speed information acquiring unit variably outputs the interval count value according to operation states of the processor unit.

According to another aspect of embodiments of the present invention, a method is provided for acquiring speed information of an encoder, comprising electrically outputting an encoder signal corresponding to a driving speed, outputting a preset interval count value based on the resolution of the encoder that outputs the encoder signal, and outputting the interrupt count value for calculating information using the encoder signal and the interval count value.

The step of outputting the preset interval count value further comprises acquiring the speed information using Equation (1), repeated below, $$V = (N*S)/(C*T) \quad (1)$$

wherein, 'V' denotes present speed information, 'N' denotes the interval count value, 'S' denotes a displacement value per count of the encoder 100, 'C' denotes the interrupt count value, and 'T' denotes an elapsed time per clock signal.

The step of acquiring the encoder speed information variably outputs the interval count value according to operation states of the processor unit.

BRIEF DESCRIPTION OF THE DRAWING FIGURES

The above aspects and other features of embodiments of the present invention will become more apparent by describing in detail exemplary embodiments thereof with reference to the attached drawing figures, wherein;

FIG. 4 is a flowchart for explaining an exemplary method for acquiring speed information according to an embodiment of the present invention.

Throughout the drawings, like reference numerals will be understood to refer to like parts, components and structures.

DETAILED DESCRIPTION OF THE EXEMPLARY EMBODIMENTS

Figure 1:
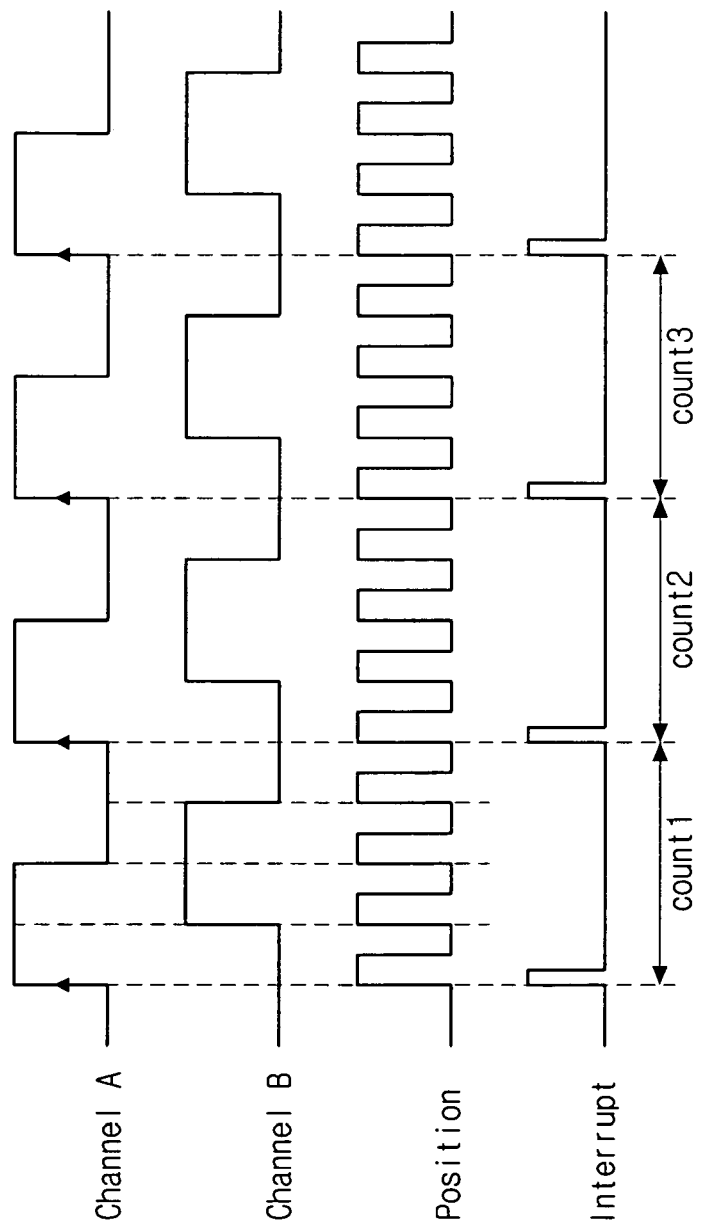
FIG. 1 is a view for illustrating a conventional method for acquiring speed information.

Hereinafter, exemplary embodiments of the present invention will be described in detail with reference to the accompanying drawing figures.

In the following description, same drawing reference numerals are used for the same elements even in different drawings. The matters defined in the description such as detailed construction and element descriptions, are provided to assist in a comprehensive understanding of embodiments of the present invention. Also, well-known functions or constructions are not described in detail since they would obscure the invention in unnecessary detail.

Figure 2:
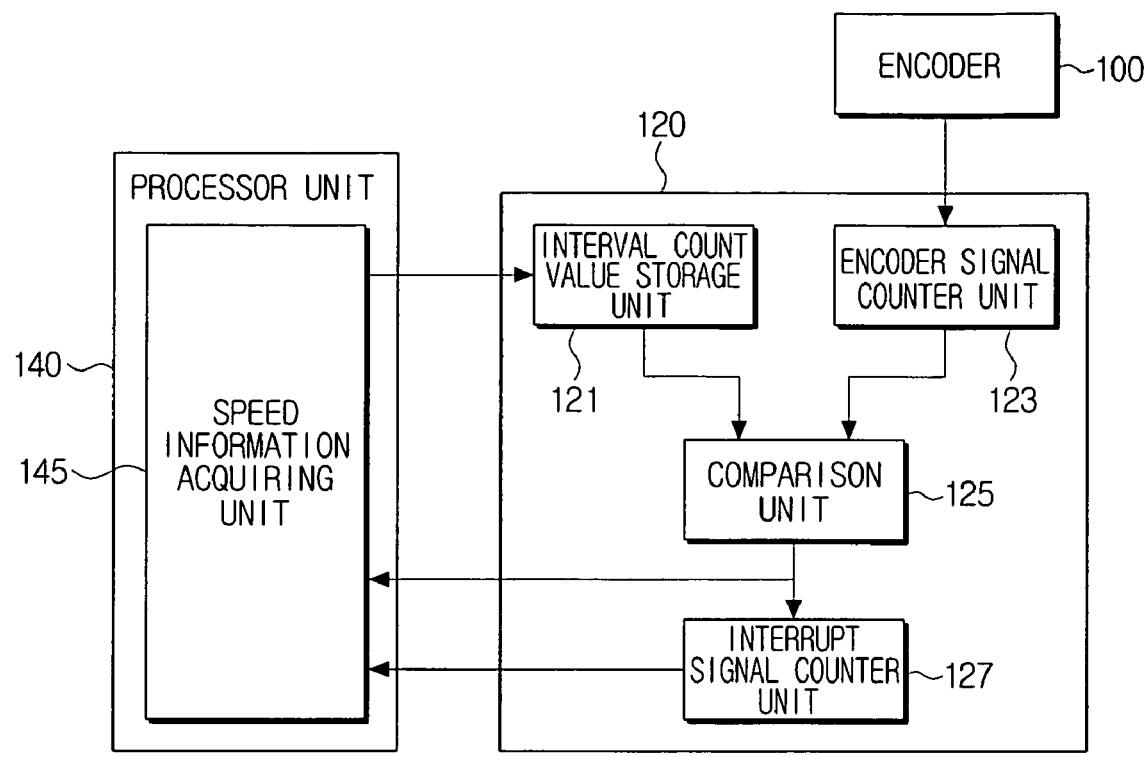
FIG. 2 is a block diagram showing a structure of an exemplary electronic device according to an embodiment of the present invention.

FIG. 2 is a block diagram showing a structure of an exemplary electronic device according to an embodiment of the present invention.

Referring to FIG. 2, the electronic device according to an exemplary embodiment of the present invention comprises an encoder 100, an integrated circuit unit 120, and a processor unit 140.

The encoder 100 transmits a light projected from a light source through a slit formed on a film strip or a rotation wheel, thereby converting the light into an electric signal, and outputs the electric signal. Hereinafter, the electrical signal output from the encoder 100 will be referred to as an 'encoder signal'. The encoder signal comprises two pulse signals having the same period and a phase difference of 90 degrees.

The integrated circuit unit 120 generates an interrupt count value for calculating the speed information with respect to the encoder signal. The integrated circuit unit 120 comprises an interval count value storage unit 121, an encoder signal counter unit 123, a comparison unit 125, and an interrupt signal counter unit 127.

The interval count value storage unit 121 stores an interval count value output from the processor unit 140 that is described in greater detail below. Here, the interval count value is appropriately set by a user according to the resolution of the encoder 100 and the performance of the processor unit 140. More particularly, the interval count value is predicted and set by a moved distance, that is, a displacement value of the slit on the encoder 100.

The encoder signal counter unit 123 generates an encoder count value which is an actual counted moved distance of the slit on the encoder 100, using the encoder signals output from the encoder 100.

The comparison unit 125 compares the interval count value with the encoder count value and generates an interrupt signal at the moment when the two values substantially correspond to each other. That is, when the predicted displacement value of the slit and the actual displacement value substantially correspond to each other, the comparison unit 125 generates and outputs the interrupt signal.

The interrupt signal counter unit 127 counts the number of clock signals from a point of generating a previous interrupt signal to a point of generating a present interrupt signal output from the comparison unit 125, to thereby generate the interrupt count value. Additionally, the interrupt signal counter unit 127 updates the previously stored interrupt count value and outputs the updated interrupt count value.

The processor unit 140 calculates and processes data required to perform the operations of the electronic device. For this, the processor unit 140 comprises a speed information acquiring unit 145. The speed information acquiring unit 145 supplies the integrated circuit unit 120 with the interval count value which is properly set according to the resolution of the encoder 100 and the performance of the processor unit 140. Further, the speed information acquiring unit 145 calculates the speed information using the interval count value being output from the integrated circuit unit 120.

The processor unit 140 calculates proportional-plus-integrate-plus-derivative (PID) on the basis of the calculated speed information, and generates and applies a pulse width modulation (PWM) signal to a drive circuit (not shown) so that a voltage is supplied to the motor (not shown).

Figure 3:
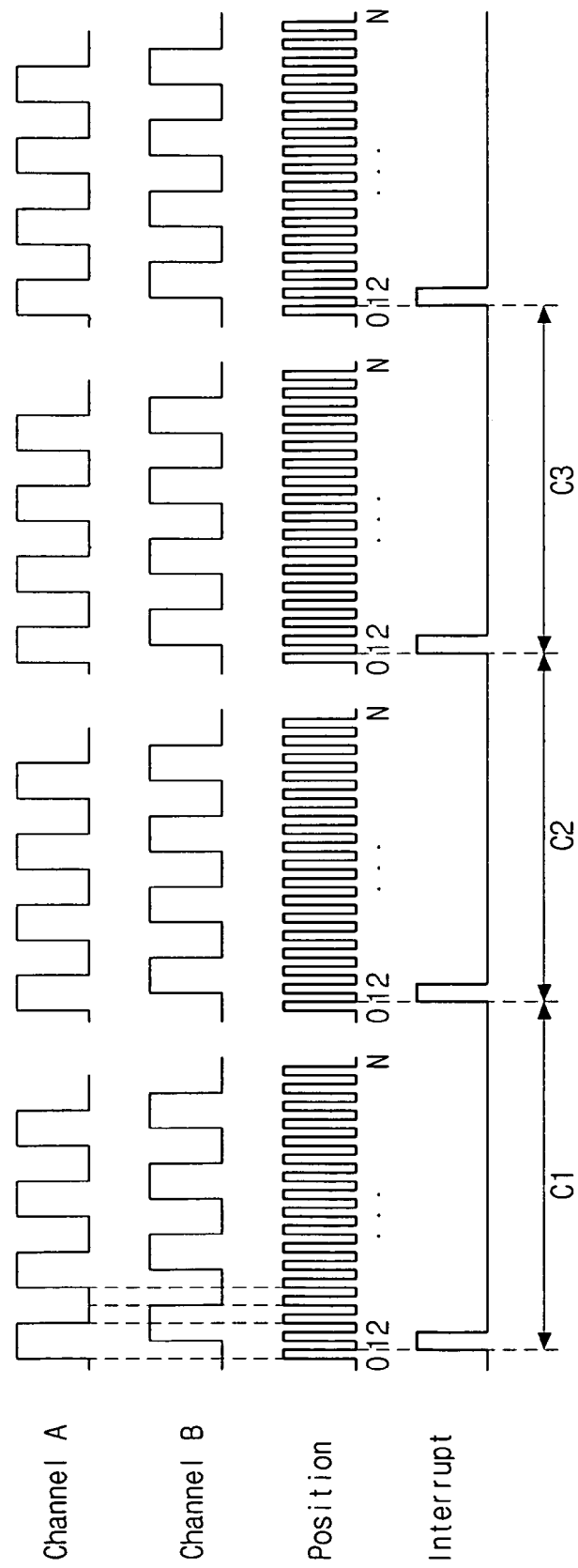
FIG. 3 is a view for illustrating an exemplary method for acquiring speed information according to an embodiment of the present invention.

FIG. 3 is a view illustrating an exemplary method for acquiring speed information, according to an embodiment of the present invention.

Referring to FIG. 3, at the moment when a channel-A signal which is the encoder signals output from the encoder 100, and the interval count value properly set according to the resolution of the encoder 100 and the performance of the processor unit 140, substantially correspond to each other, the interrupt signal is generated. At this time, the displacement value of the encoder 100 is reset to '0'.

Upon generation of the interrupt signal, the interrupt signal counter unit 127 counts time intervals between the interrupt signals using a system clock, and stores the time interval as the interrupt count value C1. When a new interrupt signal is generated, the stored value C1 is updated to interrupt count value C2. In the same manner, the value C2 is updated to interrupt count value C3, and the most current interrupt count value C3 is supplied to the speed information acquiring unit 145.

The speed information acquiring unit 145 calculates the speed information by applying the interrupt count value to Equation (1) repeated below, $$V=(N*S)/(C*T) \qquad (1)$$

wherein, 'V' denotes present speed information, 'N' denotes the interval count value, 'S' denotes a displacement value per count of the encoder 100, 'C' denotes the interrupt count value, and 'T' denotes an elapsed time per clock signal.

FIG. 4 is a flowchart illustrating an exemplary method for acquiring speed information according to an embodiment of the present invention.

Referring to FIG. 4, the interval count value is set based on the resolution of the encoder and the performance of the processor. More specifically, the user properly sets the interval count value according to the encoder configuration determined by masking intervals of the slit formed at the encoder 100 and the performance of the processor unit 140 that drives the electronic device. Here, the interval count value is variably set even during the operation of the electronic device at step (S200).

The encoder signal counter unit 123 resets a present position for comparison with the interval count value to an initial value. That is, the encoder signal counter unit 123 sets the present position of the slit on the encoder 100 to '0' with reference to encoder signals output from the encoder 100 at step (S210).

Next, the encoder signal counter unit 123 counts the encoder signals and outputs the encoder count value. More specifically, referring to the encoder signals output from the encoder 100, the encoder signal counter unit 123 counts the present position of the slit on the encoder 100 and outputs the encoder count value at step (S230).

The comparison unit 125 compares the interval count value with the encoder count value at step (S250) and, when the two values substantially correspond with each other, generates the interrupt signal at step (S270). In the case where the interval count value and the encoder count value do not substantially correspond to each other, steps (S230) and (S250) are repeatedly performed.

The interrupt signal counter unit 127 counts the number of clock signals from the time point of generating the previous interrupt signal to the time point of generating the present interrupt signal to update the interrupt count value. That is, the interrupt signal counter unit 127 generates the interrupt count value, thereby updating the previously stored interrupt count value to a new interrupt count value. Then, additionally, the interrupt signal counter unit 127 supplies the new interrupt count value to the speed information acquiring unit 145 at step (S290).

The speed information for one period can be acquired through the above-described processes. The acquired speed information can then be used to control the driving of a motor by repetitively performing the processes. The electronic device using the speed information can comprise any number of image forming apparatuses such as a copier, printer, facsimile, multifunction apparatus, and so forth.

As can be appreciated from the above description of embodiments of the present invention, the time interval of generating interrupts is controlled according to the purpose or control section of the electronic device, thereby reducing errors caused in acquiring the speed information. Moreover, the control performance can be improved by reducing a load applied to the processor.

While the present invention has been shown and described with reference to certain exemplary embodiments thereof, it will be understood by those skilled in the art that various changes in form and details may be made therein without departing from the spirit and scope of the invention as defined by the appended claims.

What is claimed is:

1. An electronic device, comprising:
   an encoder which electrically outputs an encoder signal corresponding to a driving speed;
   a processor unit which outputs a preset interval count value based on a resolution of the encoder; and
   an integrated circuit unit which receives the encoder signal from the encoder and the preset interval count value from the processor unit, and which outputs an interrupt count value to the processor unit for calculating speed information, using the encoder signal and the preset interval count value.

2. The electronic device of claim 1, wherein the integrated circuit unit comprises:
   an interval count value storage unit which stores the preset interval count value;
   an encoder signal counter unit which counts an actual moved distance using the encoder signal and outputting an encoder count value;
   a comparison unit which generates and sends an interrupt signal to the processor unit when the interval count value substantially corresponds to the encoder count value as a result of a comparison of the preset interval count value and the encoder count value; and
   an interrupt signal counter unit which generates the interrupt count value by counting intervals between the interrupt signal and a previous interrupt signal as the number of clock signals, and updates the previously stored interrupt count value.

3. The electronic device of claim 2, wherein the processor unit comprises a speed information acquiring unit which calculates the speed information using a following equation:

$$V=(N*S)/(C*T)$$

wherein, 'V' denotes present speed information, 'N' denotes the preset interval count value, 'S' denotes a displacement value per count of the encoder, 'C' denotes the interrupt count value, and 'T' denotes an elapsed time per clock signal.

4. The electronic device of claim 3, wherein the speed information acquiring unit is configured to vary the preset interval count value according to operation states of the processor unit.

5. A method for acquiring speed information of an encoder, comprising:
   electrically outputting an encoder signal corresponding to a driving speed;
   outputting a preset interval count value based on a resolution of the encoder that outputs the encoder signal; and
   outputting an interrupt count value for calculating speed information, using the encoder signal and the preset interval count value.

6. The method of claim 5, wherein the step of outputting the interrupt count value comprises:
   storing the preset interval count value;
   counting an actual moved distance on the encoder using the encoder signal and outputting an encoder count value;
   generating an interrupt signal when the interval count value substantially corresponds to the encoder count value; and
   generating the interrupt count value by counting intervals between the interrupt signal and a previous interrupt signal as the number of clock signals, and updating the previously stored interrupt count value.

7. The method of claim 6, wherein the step of outputting the preset interval count value further comprises calculating the speed information using a following equation:

$$V=(N*S)/(C*T)$$

wherein, 'V' denotes present speed information, 'N' denotes the preset interval count value, 'S' denotes a displacement value per count of the encoder, 'C' denotes the interrupt count value, and 'T' denotes an elapsed time per clock signal.

8. The method of claim 7, wherein the step of calculating the speed information can vary the preset interval count value according to operation states of the processor unit.

9. A computer readable medium storing a computer program for acquiring speed information of an encoder, comprising:
- a first set of instructions for electrically outputting an encoder signal corresponding to a driving speed;
- a second set of instructions for outputting a preset interval count value based on a resolution of the encoder that outputs the encoder signal; and
- a third set of instructions for outputting an interrupt count value for calculating speed information using the encoder signal and the preset interval count value.

10. The computer readable medium storing a computer program of claim 9, wherein the third set of instructions for outputting the interrupt count value comprises:
- a set of instructions for storing the preset interval count value;
- a set of instructions for counting an actual moved distance on the encoder using the encoder signal and outputting an encoder count value;
- a set of instructions for generating an interrupt signal when the interval count value substantially corresponds to the encoder count value; and
- a set of instructions for generating the interrupt count value by counting intervals between the interrupt signal and a previous interrupt signal as the number of clock signals, and updating the previously stored interrupt count value.

11. The computer readable medium storing a computer program of claim 10, wherein the second set of instructions for outputting the preset interval count value comprises calculating the speed information using a following equation:

$$V=(N*S)/(C*T)$$

wherein, 'V' denotes present speed information, 'N' denotes the preset interval count value, 'S' denotes a displacement value per count of the encoder, 'C' denotes the interrupt count value, and 'T' denotes an elapsed time per clock signal.

* * * * *